US011841825B2

(12) United States Patent
Bankier et al.

(10) Patent No.: US 11,841,825 B2
(45) Date of Patent: Dec. 12, 2023

(54) INODE CLASH RESOLUTION DURING FILE SYSTEM MIGRATION

(71) Applicant: Dell Products, L.P., Round Rock, TX (US)

(72) Inventors: John Bankier, Glasgow (GB); Ronald Brown, Fife (GB)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/538,387

(22) Filed: Nov. 30, 2021

(65) Prior Publication Data

US 2023/0169034 A1 Jun. 1, 2023

(51) Int. Cl.
| | |
|---|---|
| G06F 7/00 | (2006.01) |
| G06F 16/11 | (2019.01) |
| G06F 16/13 | (2019.01) |
| G06F 16/172 | (2019.01) |

(52) U.S. Cl.
CPC ............ *G06F 16/119* (2019.01); *G06F 16/13* (2019.01); *G06F 16/172* (2019.01)

(58) Field of Classification Search
CPC ...... G06F 16/119; G06F 16/13; G06F 16/172; G06F 16/185; G06F 16/214
See application file for complete search history.

(56) References Cited

U.S. PATENT DOCUMENTS

| | | | | |
|---|---|---|---|---|
| 5,991,753 | A * | 11/1999 | Wilde | ...................... G06F 16/10 |
| 6,938,039 | B1 * | 8/2005 | Bober | ................... G06F 16/119 |
| | | | | 707/827 |
| 7,653,699 | B1 * | 1/2010 | Colgrove | ................ G06F 16/10 |
| | | | | 709/215 |
| 7,958,097 | B1 | 6/2011 | Tormasov et al. | |
| 8,601,220 | B1 | 12/2013 | Corbin et al. | |
| 8,655,848 | B1 * | 2/2014 | Leverett | ................ G06F 16/128 |
| | | | | 709/201 |
| 8,671,072 | B1 | 3/2014 | Shah et al. | |
| 9,223,791 | B2 | 12/2015 | Whitehouse | |

(Continued)

OTHER PUBLICATIONS

Brown, et al. "Efficient Transparent Switchover of File System Consolidation Migrations" U.S. Appl. No. 17/538,363, filed Nov. 30, 2021, 54 pages.

(Continued)

*Primary Examiner* — Mohammed R Uddin
(74) *Attorney, Agent, or Firm* — Amin, Turocy & Watson, LLP

(57) ABSTRACT

A system can determine that a first destination inode number of a first destination inode of destination inodes is equal to a first source inode number of a file. The system can create a second file on the source file system, wherein the second file is stored in a second source inode of the source inodes having a second source inode number of the source inode numbers. The system can determine that the destination file system lacks an inode that has the second source inode number. The system can move a third file stored in the first destination inode to a second destination inode of the destination inodes that has a second destination inode number of the destination inode numbers. The system can migrate the first file to the destination file system, wherein the destination file system stores the first file with the first destination inode number.

20 Claims, 11 Drawing Sheets

(56) References Cited

U.S. PATENT DOCUMENTS

| | | |
|---|---|---|
| 9,305,071 B1 | 4/2016 | Bono et al. |
| 9,323,758 B1 | 4/2016 | Stacey et al. |
| 9,639,553 B2 | 5/2017 | Hall et al. |
| 10,083,181 B2 | 9/2018 | Chun |
| 10,430,389 B1* | 10/2019 | Gupta ................. G06F 16/13 |
| 10,552,371 B1 | 2/2020 | Liao et al. |
| 11,533,196 B2* | 12/2022 | Cananzi ........... H04L 12/40052 |
| 11,546,288 B2* | 1/2023 | Chander ............ H04L 12/4641 |
| 2003/0158834 A1* | 8/2003 | Sawdon ................. G06F 16/10 |
| 2003/0182313 A1* | 9/2003 | Federwisch ........ G06F 11/2066 |
| | | 714/E11.107 |
| 2003/0182322 A1* | 9/2003 | Manley ............... G06F 16/184 |
| 2003/0182325 A1* | 9/2003 | Manley ............. G06F 11/2074 |
| | | 714/E11.107 |
| 2006/0129513 A1 | 6/2006 | Nakatani et al. |
| 2007/0038689 A1* | 2/2007 | Shinkai ............... G06F 16/119 |
| 2007/0100980 A1 | 5/2007 | Kataoka et al. |
| 2008/0172423 A1* | 7/2008 | Shinkai ................ G06F 3/0685 |
| | | 707/999.203 |
| 2009/0157690 A1 | 6/2009 | Haswell |
| 2011/0016085 A1* | 1/2011 | Kuo ..................... G06F 16/184 |
| | | 707/615 |
| 2013/0218847 A1* | 8/2013 | Saika .................. G06F 16/182 |
| | | 707/E17.002 |
| 2014/0019413 A1 | 1/2014 | Braam et al. |
| 2014/0019425 A1* | 1/2014 | Honami ............... G06F 16/174 |
| | | 707/E17.002 |
| 2014/0108475 A1* | 4/2014 | Yamada ............... G06F 16/119 |
| | | 707/829 |
| 2014/0188953 A1* | 7/2014 | Lin ....................... G06F 16/183 |
| | | 707/827 |
| 2015/0120792 A1 | 4/2015 | Khandelwal et al. |
| 2015/0293699 A1 | 10/2015 | Bromley et al. |
| 2016/0055224 A1 | 2/2016 | Shetty et al. |
| 2016/0321295 A1* | 11/2016 | Dalton .................. G06F 16/14 |
| 2017/0123937 A1* | 5/2017 | Iwasaki ................ G06F 16/183 |
| 2017/0139932 A1 | 5/2017 | Hasegawa et al. |
| 2018/0189311 A1 | 7/2018 | Newhouse et al. |
| 2021/0089680 A1 | 3/2021 | Gkoulalas-Divanis et al. |
| 2021/0303519 A1 | 9/2021 | Periyagaram et al. |
| 2021/0374099 A1* | 12/2021 | Raju .................... G06F 16/164 |
| 2022/0332178 A1* | 10/2022 | Brown ................... B60J 11/04 |
| 2023/0004535 A1* | 1/2023 | Shaw ..................... G06F 16/16 |

OTHER PUBLICATIONS

Office Action dated Aug. 15, 2023 for U.S. Appl. No. 17/538,363, 51 pages.

* cited by examiner

900

(902)

↓

AS PART OF MIGRATING DATA FROM A SOURCE FILE SYSTEM TO A DESTINATION FILE SYSTEM, DETERMINING THAT A FIRST SOURCE INODE NUMBER OF A FIRST SOURCE INODE THAT STORES THE DATA ON THE SOURCE FILE SYSTEM MATCHES A SECOND DESTINATION INODE NUMBER OF A SECOND DESTINATION INODE THAT IS IN USE ON THE DESTINATION FILE SYSTEM 904

↓

CREATING A FIRST FILE ON THE SOURCE FILE SYSTEM IN A SECOND SOURCE INODE HAVING A SECOND SOURCE INODE NUMBER 906

↓

DETERMINING THAT THE DESTINATION FILE SYSTEM OMITS AN INODE THAT HAS THE SECOND SOURCE INODE NUMBER 908

↓

MOVING A SECOND FILE STORED IN THE FIRST DESTINATION INODE TO A SECOND DESTINATION INODE OF THE DESTINATION FILE SYSTEM THAT HAS A SECOND DESTINATION INODE NUMBER 910

↓

STORING THE FIRST FILE WITH THE SECOND DESTINATION INODE NUMBER ON THE DESTINATION FILE SYSTEM 912

INODE CLASH RESOLUTION DURING FILE SYSTEM MIGRATION

BACKGROUND

File system migration can generally comprise transferring a computer file system from a source computer to a destination computer. Where the source computer is a server that provides file system access to a remote client computer, the destination computer can provide that file system access to the remote client computer after a file system migration occurs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to migrate data from a source file system to a destination file system, wherein the source file system stores data in source inodes having respective source inode numbers, wherein the destination file system stores data in destination inodes having respective destination inode numbers, and wherein the data comprises a first file that is stored in a first source inode of the source inodes having a first source inode number of the source inode numbers. The system can determine that a first destination inode number of a first destination inode of the destination inodes is equal to the first source inode number. The system can create a second file on the source file system, wherein the second file is stored in a second source inode of the source inodes having a second source inode number of the source inode numbers. The system can determine that the destination file system lacks an inode that has the second source inode number. The system can move a third file stored in the first destination inode to a second destination inode of the destination inodes that has a second destination inode number of the destination inode numbers. The system can migrate the first file to the destination file system, wherein the destination file system stores the first file with the first destination inode number.

An example method can comprise, as part of migrating data from a source file system to a destination file system, determining, by a system comprising a processor, that a first source inode number of a first source inode that stores the data on the source file system matches a second destination inode number of a second destination inode that is in use on the destination file system. The method can further comprise creating, by the system, a first file on the source file system in a second source inode having a second source inode number. The method can further comprise determining, by the system, that the destination file system omits an inode that has the second source inode number. The method can further comprise moving, by the system, a second file stored in the first destination inode to a second destination inode of the destination file system that has a second destination inode number. The method can further comprise storing, by the system, the first file with the second destination inode number on the destination file system.

An example non-transitory computer-readable medium can comprise instructions that, in response to execution, cause a system comprising a processor to perform operations. These operations can comprise, in response to determining to transfer data from a first file system to a second file system, determining that a first inode number of a first inode that stores a first inode of the data on the first file system matches a second inode number of a second inode that is in use on the second file system. These operations can further comprise creating a second file on the first file system in a third inode that has a third inode number. These operations can further comprise determining that the second file system omits an inode that has the third inode number. These operations can further comprise moving a third file stored in the second inode to a fourth inode of the second file system that has the third inode number. These operations can further comprise storing the first file on the second file system with the second inode number.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow that can facilitate inode clash resolution during file system migration, in accordance with an embodiment of this disclosure;

DETAILED DESCRIPTION

Overview

Figure 1:
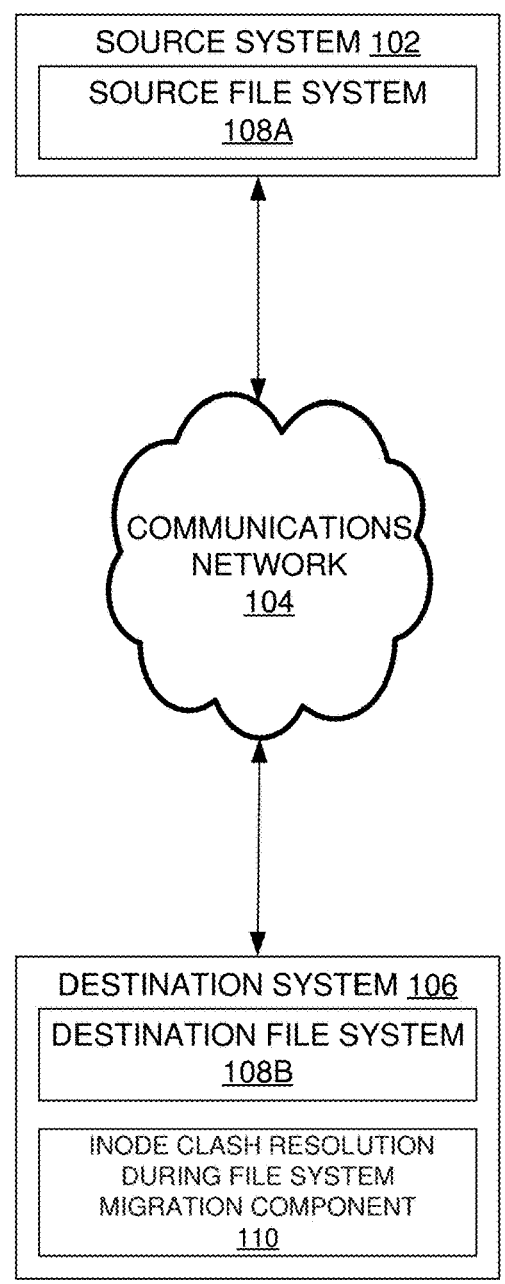
FIG. 1 illustrates an example system architecture that can facilitate inode clash resolution during file system migration, in accordance with an embodiment of this disclosure.

In some examples, a file handle identifies a file system being accessed, as well as a directory or file within that file system (which can be identified by an inode number and a generation number). File handle preservation can be implemented to provide a transparent cutover for Network File System (NFS) protocol clients during a migration. That is, a file handle that was issued by a source NFS server (before a cutover) can be usable with a destination NFS server (after the cutover).

An inode can generally comprise a data structure in a file system that describes an object, such as a file or a directory. To avoid an overhead of maintaining a file handle translation table, a tool for in-band migration can use inode preservation, where entities can be created on a destination filesystem with a same inode number and generation number as an equivalent entity from the source filesystem. This can be possible where an in-band migration is integrated into a destination server (e.g., it is not a separate appliance).

In some examples, a system that implements the present techniques can provide an interface to specify an inode number and a generation number when creating a new entity. Where two entities have a same inode number but different generation numbers, it can be determined that this is due to an inode number of one of the entities being reused for a different file system object, and the entities can be treated as non-matching.

In some examples, where a destination entity has a same inode number as a source entity but a different generation number, it can be determined to be a clash. In some examples, if a client computer attempts to refer to an entity using a file handle where the inode number of the file handle matches a current entity in the file sets, but the generation number differs, a "stale file handle" error can be returned to the client computer.

An inode preserving creation can fail where an entity already exists on a destination filesystem with a specified identity (e.g., the inode is already in use). When this happens, an inode clash resolution can be performed to "free up" a clashing inode number on the destination filesystem.

In some prior approaches, migration inode clash resolution could be implemented by deleting the clashing entity from the destination filesystem. This can be implemented where there is a guarantee that the clashing entity is part of the migration tree (e.g., the clashing entity is a previous incarnation of a migrated entity). This can be possible where there is no overlap between an inode space used by the migration tree and the destination-only content. An example where there is no overlap can be where a source filesystem contains only 32-bit inode numbers, and the destination contains 64-bit inode numbers, so non-migrated entities (e.g., filesystem configuration directories and files, and migration state files) could be created in a non-overlapping inode space (e.g., above 32 bits) on the destination.

Where both source and destination filesystems use the same size numbers for inodes (e.g., they both use 64-bit inode numbers), inode clash resolution can be implemented as follows. In a case where a clashing entity is non-migrated, it can be that it cannot be deleted, and instead is allocated a new identity (which can be referred to as an "identity swap").

In such examples, a non-clashing identity factory can be used. A non-clashing identity factory can create an identity that does not exist in either the source migration tree or the destination filesystem. This identity can then be used to perform the identity swap of the clashing entity.

In some examples, a non-clashing identity factory can use a temporary directory on the source filesystem. It can be that the temporary directory exists on the source filesystem but is not part of the migration tree. Such a temporary directory can be referred to as being "source only." When a non-clashing identity is to be used, an empty file can be created in a temporary directory on the migration source filesystem. The identity of the new file can be tested against the destination filesystem. Where the inode number is already allocated on the destination filesystem, then another empty file can be created in the temporary directory on the migration source filesystem. This approach can repeat until a resultant inode number is unallocated on the destination filesystem.

In some examples, the contents of the temporary directory on the source filesystem are not deleted until the whole migration is complete, or has been cancelled. This approach can ensure that inode numbers returned by the non-clashing identity factory do not clash with an entity within the migration tree.

Some prior migration techniques do not use inode preservation, so maintain a bi-directional file handle translation table during migration. In such techniques, after migration, NFS clients can need to remount the migrated filesystem, at which point the clients see the same filesystem content, but with different file handles. Such a migration can be referred to as being "non-transparent."

Example Architectures

FIG. 1 illustrates an example system architecture 100 that can facilitate inode clash resolution during file system migration, in accordance with an embodiment of this disclosure.

As depicted, system architecture 100 comprises source system 102, communications network 104, and destination system 106. In turn, source system 102 comprises source file system 108A; and destination system 106 comprises destination file system 108B, and inode clash resolution during file system migration component 110.

Source system 102 can provide client computers with access to source file system 108A, via communications network 104. This access can comprise reading, writing, and creating files on source file system 108A.

A file system migration can occur, where source file system 108A is migrated to destination system 106 as destination file system 108B. In some examples, multiple migrations can be performed concurrently, and to multiple separate destinations.

Part of a migration can involve changing a network routing of source system 102 and destination system 106, such that a network address (e.g., an Internet Protocol (IP) address) or a domain name (e.g., according to a Domain Name System (DNS)) that identified source system 102 prior to the migration now identifies destination system 106 after the migration. This changing can sometimes be referred to as a switchover.

Source file system 108A and destination file system 108B can each comprise inodes, where an inode can generally comprise a data structure that describes a file system object (e.g., a file or a directory). Inodes within a file system can have unique inode numbers. There can be inode clashes between source file system 108A and destination file system 108B, where an inode number being used for one data object in source file system 108A is used for a different data object in destination file system 108B. In some examples, inode numbers for particular data objects can be maintained during a migration, so a clash between source inode numbers and destination inode numbers can be resolved.

Inode clash resolution during file system migration component 110 can resolve inode clashes, as described with respect to FIGS. 2-7. In some examples, inode clash resolution during file system migration component 110 can implement part(s) of the process flows of FIGS. 8-10 to facilitate inode clash resolution during file system migration.

Figure 11:
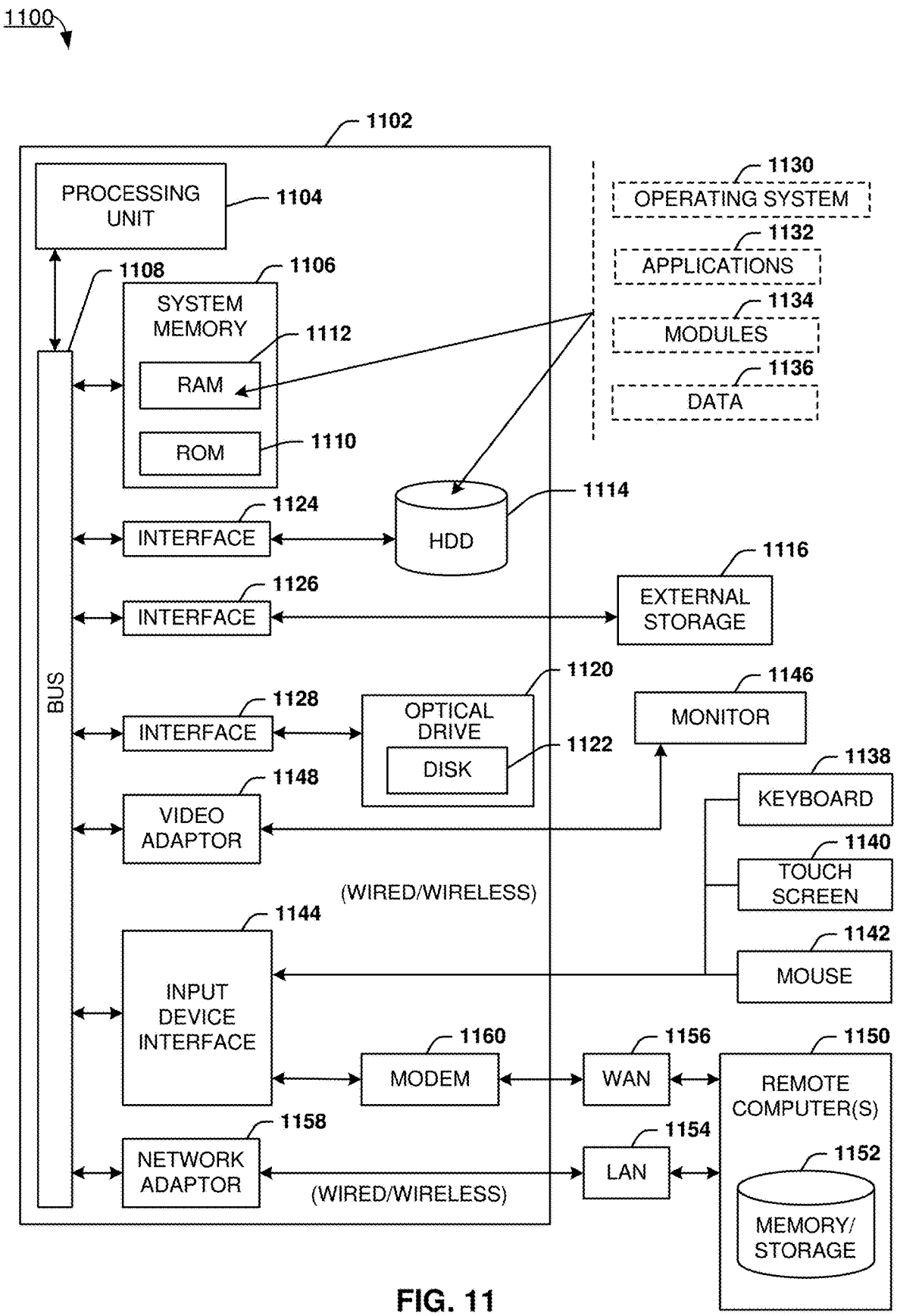
FIG. 11 illustrates an example block diagram of a computer operable to execute an embodiment of this disclosure.

Each of source system 102, and/or destination system 106 can be implemented with part(s) of computing environment 1100 of FIG. 11. Communications network 104 can comprise a computer communications network, such as the INTERNET.

It can be appreciated that system architecture 100 is one example system architecture for inode clash resolution during file system migration, and that there can be other system architectures that facilitate inode clash resolution during file system migration. For example, system architecture 100 depicts inode clash resolution during file system migration component 110 as being part of destination system 106. There can be examples where inode clash resolution during file system migration component 110 is part of source system 102, or part of a third system that is separate from both source system 102 and destination system 106.

Figure 2:
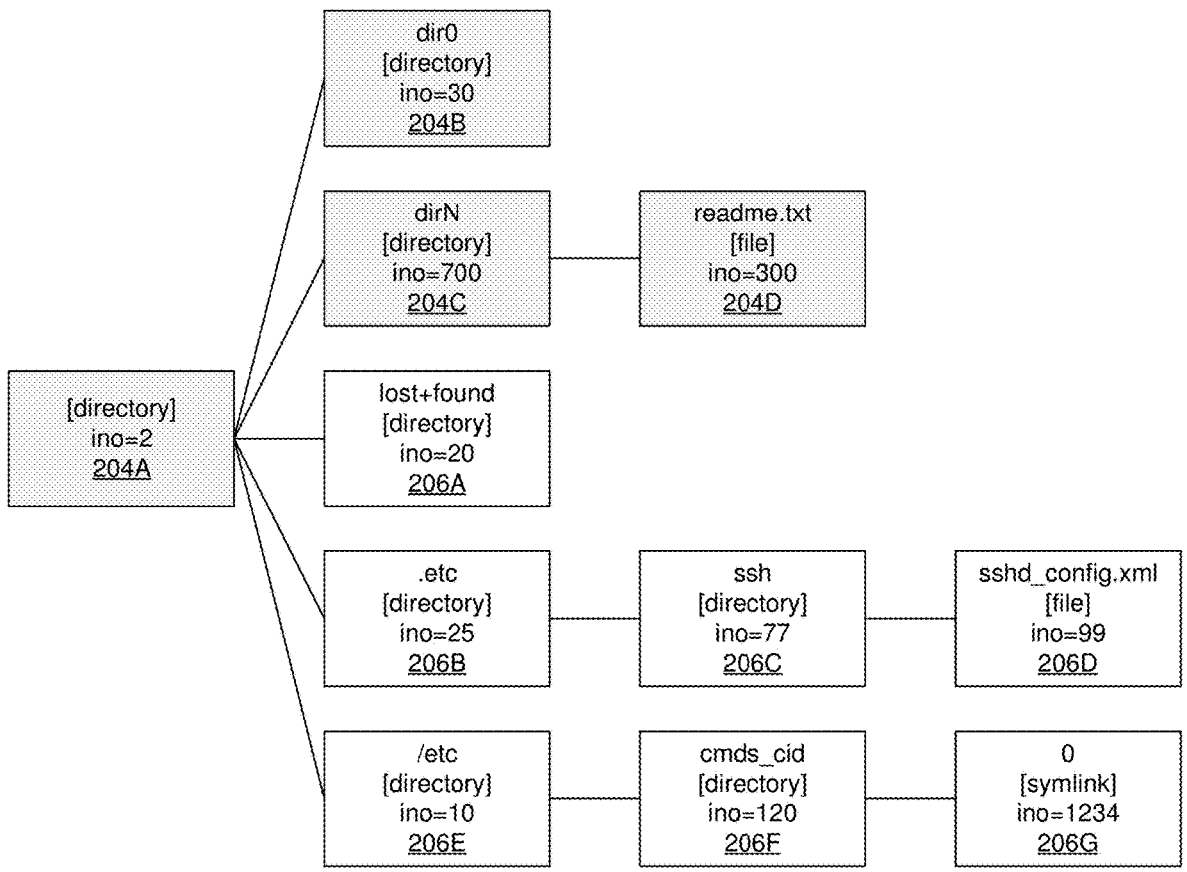
FIG. 2 illustrates an example system architecture of a source file system that can facilitate inode clash resolution during file system migration, in accordance with an embodiment of this disclosure.

FIG. 2 illustrates an example system architecture 200 of a source file system that can facilitate inode clash resolution during file system migration, in accordance with an embodiment of this disclosure.

System architecture 200 comprises inode clash resolution during file system migration component 202 (which can be similar to inode clash resolution during file system migration component 110 of FIG. 1), and various inodes of a source file system, which can be similar to source file system 108A.

System architecture 200 comprises inodes that are within a migration tree to be migrated to a destination file system. These are inode 204A, inode 204B, inode 204C, and inode 204D. These are indicated by shading in FIG. 2.

System architecture 200 also comprises inodes that fall outside of a migration tree. These are inode 206A, inode 206B, inode 206C, inode 206D, inode 206E, inode 206F, and inode 206G.

Each inode has a corresponding inode number, an indication of a type of object associated with the object (e.g., directory, file, or symlink), and a possible name of the object. For example, inode 204B has the name "dir0," is a directory, and has an inode number of 30.

Inode clash resolution during file system migration component 202 can migrate those inodes of system architecture 200 within the migration tree to a destination file system. Where there is an inode clash between the source file system and the destination file system, inode clash resolution during file system migration component 202 can resolve the inode clash according to the present techniques.

Figure 3:
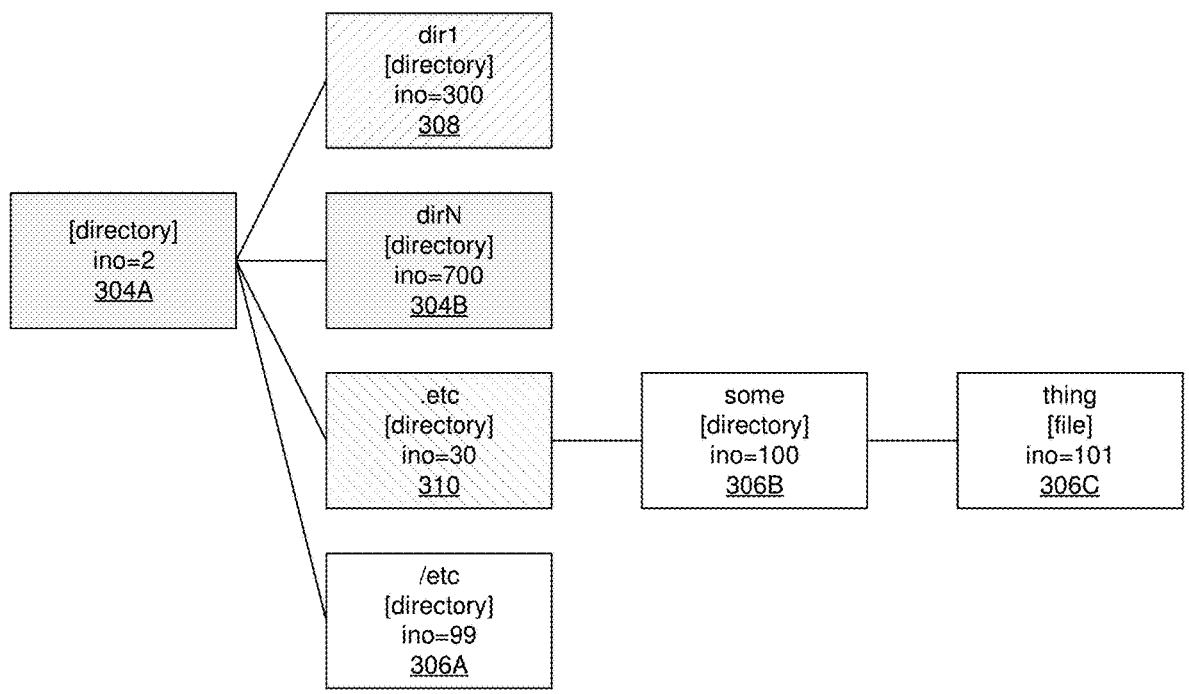
FIG. 3 illustrates an example system architecture of a destination file system that can facilitate inode clash resolution during file system migration, in accordance with an embodiment of this disclosure.

FIG. 3 illustrates an example system architecture 300 of a destination file system that can facilitate inode clash resolution during file system migration, in accordance with an embodiment of this disclosure.

System architecture 300 comprises inode clash resolution during file system migration component 302 (which can be similar to inode clash resolution during file system migration component 110 of FIG. 1), and various inodes of a destination file system, which can be similar to destination file system 108B.

A migration can be made of the migration tree of system architecture 300 to the destination file system of system architecture 300.

System architecture 300 comprises inodes that can be classified in different ways. System architecture 300 comprises inodes that are within the migration tree and for which there is not an inode clash. These are inode 304A and inode 304B. There is not an inode clash because, e.g., inode 204A and inode 304A each have an inode number of 2, and they store the same object. So, in a migration, inode 204A can be used to overwrite inode 304A with a possibly-updated version of that object.

System architecture 300 comprises inodes that are outside of the migration tree and for which there is not an inode clash. These are inode 306A, inode 306B, and inode 306C. There is no inode clash because, e.g., inode 306B has an inode number of 100, and there is no inode in the migration tree of system architecture 300 with that inode number.

System architecture 300 comprises an inode that is inside of the migration tree and for which there is an inode clash. This is inode 308. Inode 308 has an inode number of 300, just like inode 204D of FIG. 2. However, these two inodes store different objects—inode 308 stores directory "dir1," and inode 204D stores file "readme.txt."

System architecture 300 comprises an inode that is outside of the migration tree and for which there is an inode clash. This is inode 310. Inode 310 has an inode number of 30, just like inode 204B of FIG. 2. However, these two inodes store different objects—inode 310 stores directory ".etc," and inode 204D stores directory "dir0."

Inode clash resolution during file system migration component 302 can resolve these inode clashes as part of migrating the source file system of system architecture 200 to the destination file system of system architecture 400.

Figure 4:
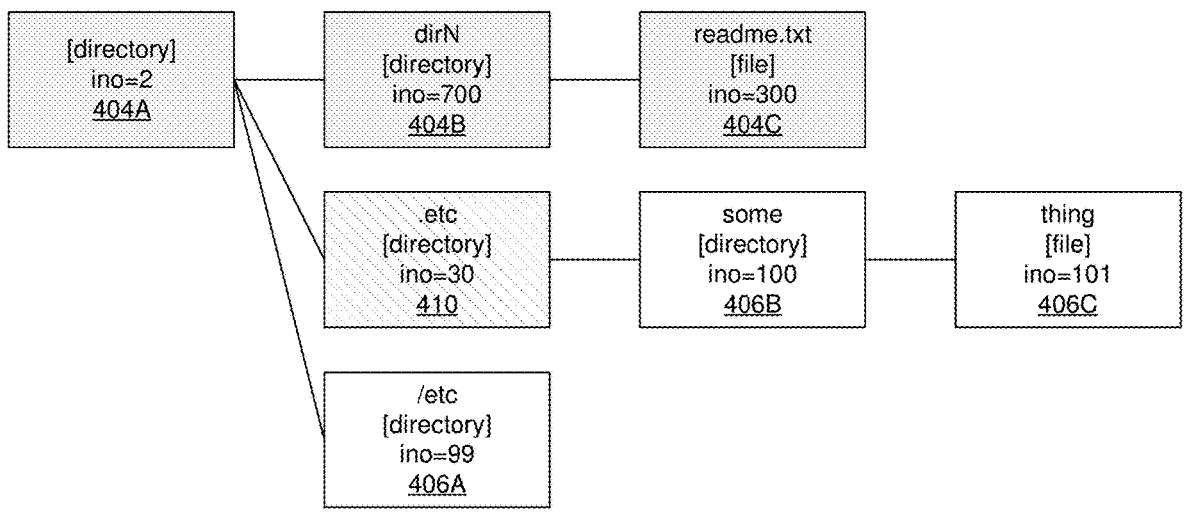
FIG. 4 illustrates an example system architecture of a destination file system where a clashing inode is located inside of a migration tree, and that can facilitate inode clash resolution during file system migration, in accordance with an embodiment of this disclosure.

FIG. 4 illustrates an example system architecture 400 of a destination file system where a clashing inode is located inside of a migration tree, and that can facilitate inode clash resolution during file system migration, in accordance with an embodiment of this disclosure.

System architecture 400 comprises inode clash resolution during file system migration component 402 (which can be similar to inode clash resolution during file system migration component 110 of FIG. 1), and various inodes of a destination file system, which can be similar to destination file system 108B.

The inodes of system architecture 400 comprise inode 404A, inode 404B, inode 410, inode 406B, inode 406C, and inode 406A (which can be similar to inode 304A, inode 304B, inode 310, inode 306B, inode 306C, and inode 306A of FIG. 3, respectively).

System architecture 400 can represent system architecture 300 after resolving an inode clash with an inode inside of the migration tree, where the migration is from system architecture 200.

The clash involves inode 308 (having an inode number of 300), where inode 204D has the same inode number. Where the clashing inode is within the migration tree, such as with inode 308, this can be resolved by deleting the clashing inode on the destination file system, and creating a new inode with the same inode number for the inode being migrated.

Relative to system architecture 300, there is not an analogue of inode 308 in system architecture 300. However, there is inode 404C, which does not have an equivalent inode in system architecture 300 (e.g., there is not an inode that that depends from inode 304B, like inode 404C does for inode 404B). Inode 404C can store a same object as inode 204D, and be part of migrating inode 204D to a destination file system.

Figure 5:
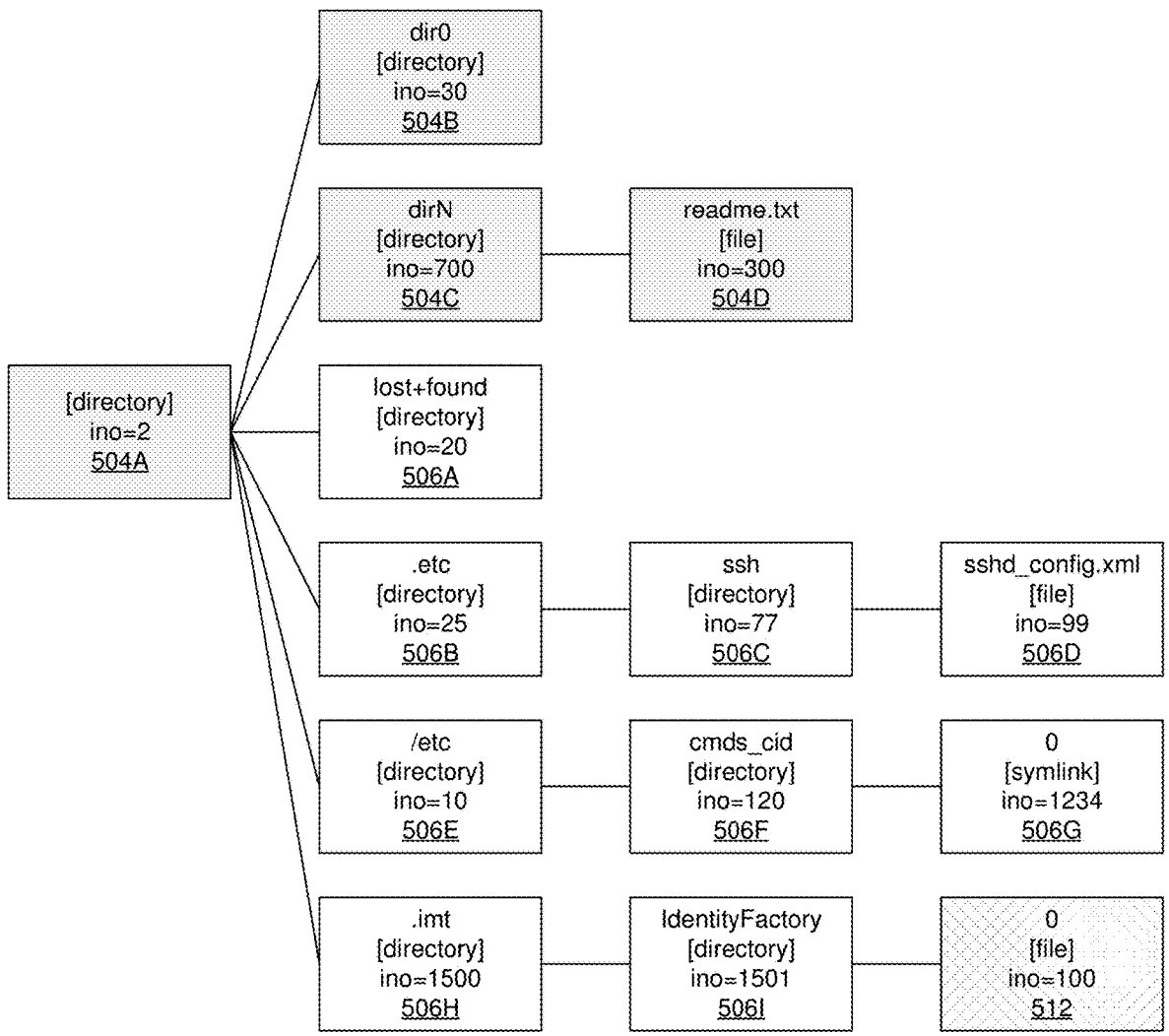
FIG. 5 illustrates an example system architecture of a source file system where a clashing inode is located outside of a migration tree, and that can facilitate inode clash resolution during file system migration, in accordance with an embodiment of this disclosure.

FIG. 5 illustrates an example system architecture 500 of a source file system where a clashing inode is located outside of a migration tree, and that can facilitate inode clash resolution during file system migration, in accordance with an embodiment of this disclosure.

System architecture 500 comprises inode clash resolution during file system migration component 502 (which can be similar to inode clash resolution during file system migration component 110 of FIG. 1), and various inodes of a source file system, which can be similar to source file system 108A.

System architecture 500 can be similar to system architecture 200, where inode clash resolution during file system migration component 502 has created temp files in an attempt to generate an inode with an inode number not found on the destination file system. System architecture 200 comprises inode 504A, inode 504B, inode 504C, inode 504D, inode 506A, inode 506B, inode 506C, inode 506D, inode 506E, inode 506F, and inode 506G (which can be similar to inode 204A, inode 204B, inode 204C, inode 204D, inode 206A, inode 206B, inode 206C, inode 206D, inode 206E, inode 206F, and inode 206G, respectively).

System architecture 500 also comprises inode 506H, inode 506I, and inode 512. Inode 506H and inode 506I can be temporary directories in which a temporary file—corresponding to inode 512—is created. Then inode 512 can be an inode generated in an attempt to create an inode on the source file system that has an inode number not used on the destination file system. Here, this first attempt was unsuccessful, because inode 512 has an inode number of 100, which is the same inode number as inode 306B of FIG. 3.

Figure 6:
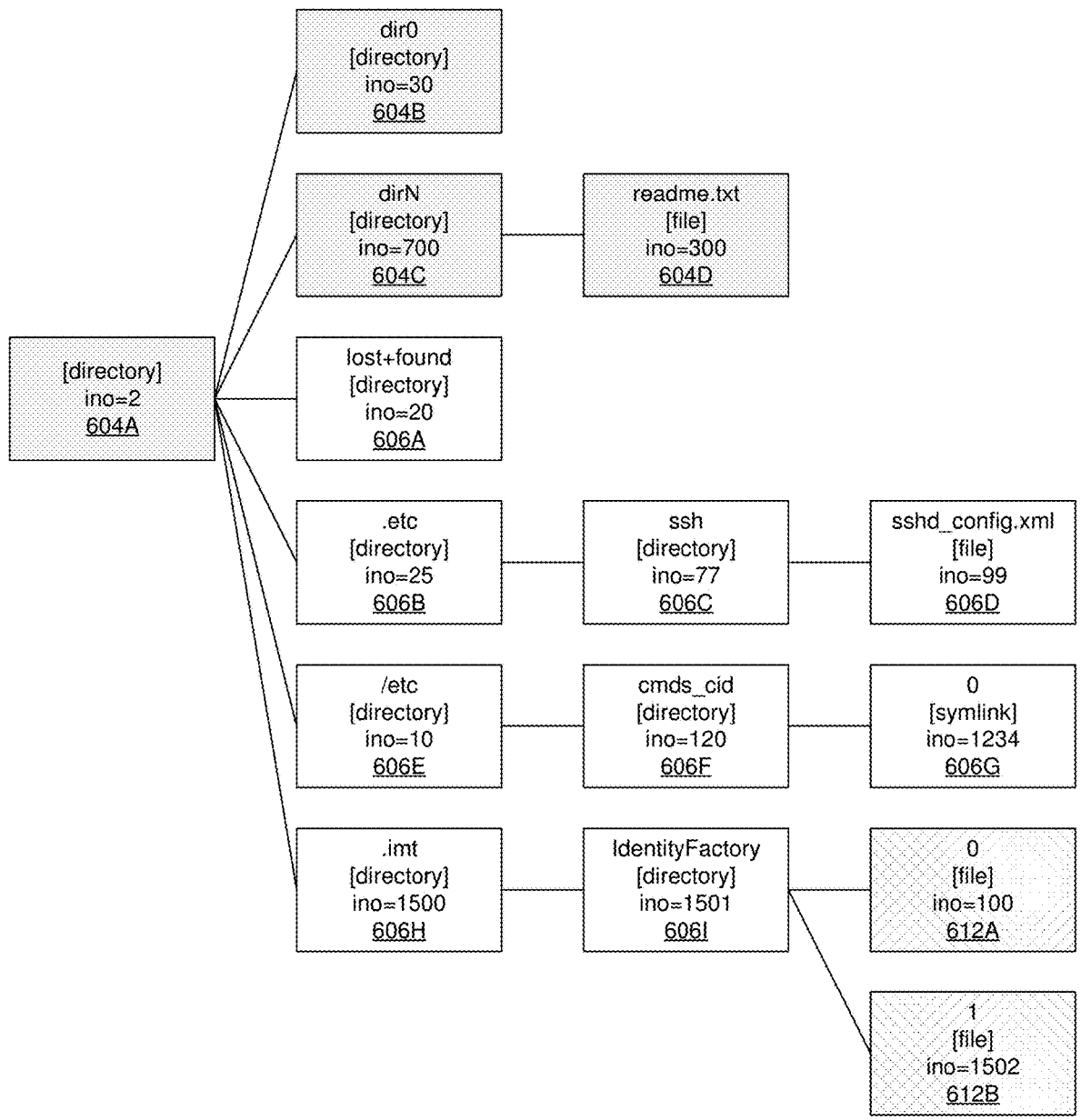
FIG. 6 illustrates another example system architecture of a source file system where a clashing inode is located outside of a migration tree, and that can facilitate inode clash resolution during file system migration, in accordance with an embodiment of this disclosure.

Subsequent attempts can be made, as described with respect to FIG. 6.

FIG. 6 illustrates another example system architecture 600 of a source file system where a clashing inode is outside inside of a migration tree, and that can facilitate inode clash resolution during file system migration, in accordance with an embodiment of this disclosure.

System architecture 600 comprises inode clash resolution during file system migration component 602 (which can be similar to inode clash resolution during file system migration component 110 of FIG. 1), and various inodes of a source file system, which can be similar to source file system 108A.

System architecture 600 can be similar to system architecture 500, where inode clash resolution during file system migration component 602 has created temp files in an attempt to generate an inode with an inode number not found on the destination file system. System architecture 500 comprises inode 604A, inode 604B, inode 604C, inode 604D, inode 606A, inode 606B, inode 606C, inode 606D, inode 606E, inode 606F, inode 606G, inode 606H, inode 606I, and inode 612A (which can be similar to inode 504A, inode 504B, inode 504C, inode 504D, inode 506A, inode 506B, inode 506C, inode 506D, inode 506E, inode 506F, inode 506G, inode 506H, inode 506I, and inode 512 respectively).

In FIG. 5, an attempt to create an inode on the source file system with an inode number not used by the destination file system was unsuccessful. In FIG. 6, a second attempt is made, which is successful. System architecture 600 comprises inode 612B, which can be made by inode clash resolution during file system migration component 602. Inode 612B has an inode number of 1502, which is not in use on the destination file system.

Figure 7:
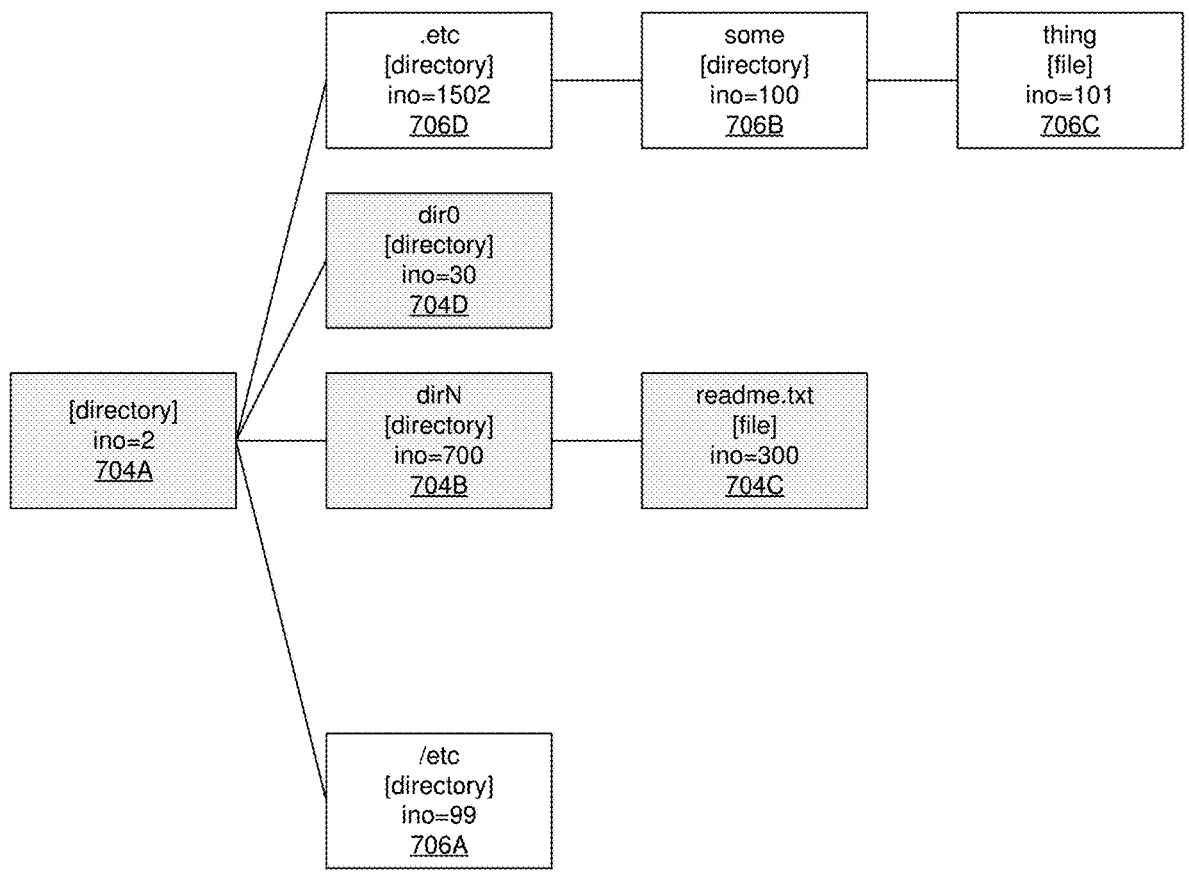
FIG. 7 illustrates an example system architecture of a destination file system where a clashing inode is located outside of a migration tree, and that can facilitate inode clash resolution during file system migration, in accordance with an embodiment of this disclosure.

This inode number then, can be used as part of moving an object stored by a clashing inode that is outside of the migration tree, as described with respect to FIG. 7.

FIG. 7 illustrates an example system architecture 700 of a destination file system where a clashing inode is located outside of a migration tree, and that can facilitate inode clash resolution during file system migration, in accordance with an embodiment of this disclosure.

System architecture 700 comprises inode clash resolution during file system migration component 702 (which can be similar to inode clash resolution during file system migration component 110 of FIG. 1), and various inodes of a destination file system, which can be similar to destination file system 108B.

System architecture 700 can represent system architecture 400 after a clashing inode outside of the migration tree has been handled.

The inodes of system architecture 700 comprise inode 704A, inode 704B, inode 704C, inode 706A, inode 706B, and inode 706C (which can be similar to inode 404A, inode 404B, inode 404C, inode 406A, inode 406B, and inode 406C of FIG. 4, respectively). Note that a relative position of inode 706B and inode 706C has changed relative to FIG. 4.

System architecture 700 also comprises inode 704D and inode 706D. Inode 706D has the inode number created on the source file system in FIG. 6 (in inode 612B). This clashing inode that contained object ".etc" (inode 410 in FIG. 4) has been moved to a new inode with a new inode number. Inode 706B and inode 706C descend from the object ".etc" the same as in FIG. 4, though now this is from a different inode.

The former inode that stored ".etc" and had an inode number of 30 has been deleted, and a new inode with that inode number has been created—inode 704D. Inode 704D stores the directory "dir0," just as the inode in the source file system does (which is inode 204B of FIG. 2). Thus, the inode clash outside of the migration tree has been resolved during a migration.

Example Process Flows

Figure 8:
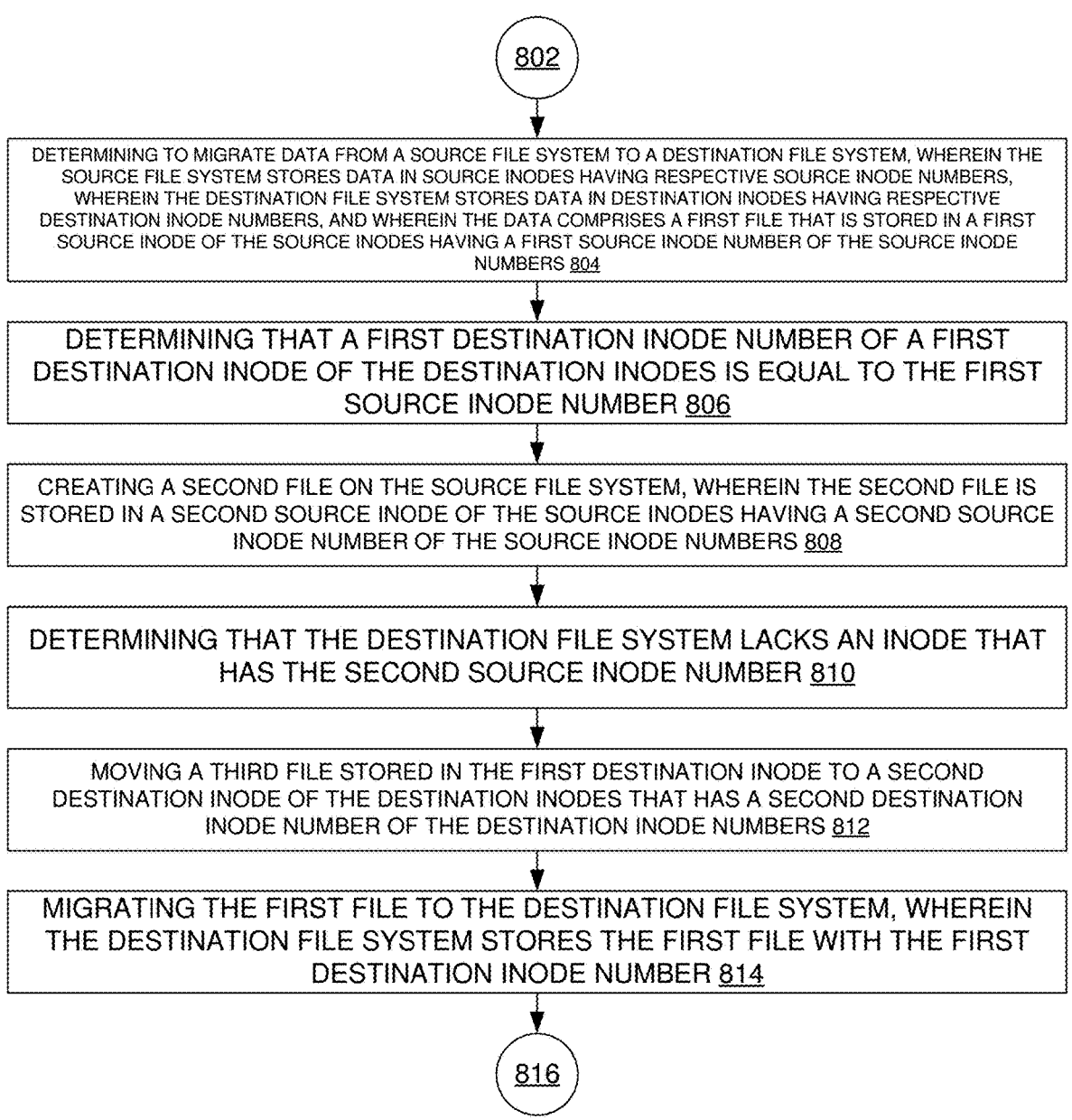
FIG. 8 illustrates an example process flow that can facilitate inode clash resolution during file system migration, in accordance with an embodiment of this disclosure.

FIG. 8 illustrates an example process flow 800 that can facilitate inode clash resolution during file system migration, in accordance with an embodiment of this disclosure. In some examples, one or more embodiments of process flow 800 can be implemented by inode clash resolution during file system migration component 110 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804. Operation 804 depicts determining to migrate data from a source file system to a destination file system, wherein the source file system stores data in source inodes having respective source inode numbers, wherein the destination file system stores data in destination inodes having respective destination inode numbers, and wherein the data comprises a first file that is stored in a first source inode of the source inodes having a first source inode number of the source inode numbers. That is, a file system migration can be performed between two file systems that use inodes. It can be that inode numbers of the source file system are to be preserved on the destination file system so that file handles issued on the source file system can be used with the destination file system.

After operation 804, process flow 800 moves to operation 806.

Operation 806 depicts determining that a first destination inode number of a first destination inode of the destination inodes is equal to the first source inode number. That is, source and destination inode numbers can be compared. An object being migrated can be stored in an inode on the source file system that has an inode number that is the same as an inode number of an inode on the destination system, where the destination inode is being used to store a different object. This can be referred to as an inode clash.

In some examples, operation 806 comprises determining that the first destination inode is stored outside of a migration path of the destination file system. That is, the clashing node on the destination file system can be stored outside of a migration tree to which migrated objects from the source file system are to be stored in the destination file system.

After operation 806, process flow 800 moves to operation 808.

Operation 808 depicts creating a second file on the source file system, wherein the second file is stored in a second source inode of the source inodes having a second source inode number of the source inode numbers. That is, an identity factory on the source file system can be used to create a source file system inode with a new inode number (e.g., inode 612B of FIG. 6).

In some examples, the second file is empty. That is, a file created as part of generating an inode number on the source that is unused on the destination can be an empty file that does not store data.

In some examples, operation 808 comprises storing the second file in a temporary folder, and deleting the temporary folder in response to determining that migrating the data is completed. That is, the second file can be a temporary file that is stored in a temporary folder.

In some examples, the second folder is stored in a portion of the source file system that is outside of a migration path of the data. In some examples, operation 808 comprises refraining from copying the second file from the source file system and to the destination file system as part of migrating the data. That is, it can be that the temporary folder is not stored in the migration path, so is not migrated to the destination file system as part of the migration.

After operation 808, process flow 800 moves to operation 810.

Operation 810 depicts determining that the destination file system lacks an inode that has the second source inode number. That is, it can be determined that the inode created in operation 806 has an inode number that is not currently in use on the destination file system. Whether a particular inode number is used or unused on the destination file system can be determined.

After operation 810, process flow 800 moves to operation 812.

Operation 812 depicts moving a third file stored in the first destination inode to a second destination inode of the destination inodes that has a second destination inode number of the destination inode numbers. That is, the object stored on the destination file system in the inode with the inode number clash can be moved to a new inode on the destination file system, where this new inode has the same inode number as the inode created in operation 808.

In some examples, the contents of a particular destination inode can be swapped, so that a particular object can be stored in an inode having a particular inode number. In other examples, directories or files can be created on the destination having a specific inode number (where that inode number is not currently used).

After operation 812, process flow 800 moves to operation 814.

Operation 814 depicts migrating the first file to the destination file system, wherein the destination file system stores the first file with the first destination inode number. That is, the object on the source file system that is subject to the inode clash can be migrated to the destination file system and stored in an inode with the same inode number as on the source file system. In some examples, this destination inode can be the pre-existing inode with that inode number. In some examples, the pre-existing inode with that inode number can be deleted, and a new inode with that inode number can be created.

In some examples, operation 814 comprises, as part of migrating the data, determining that the data comprises a third source inode of the source inodes having a third source inode number of the source inode numbers; determining that a third destination inode of the destination inodes has a third destination inode number of the destination numbers that matches the third source inode number; and in response to determining that the third destination inode is stored inside of a migration path of the destination file system, deleting a fourth file that is stored in the third destination inode. That is, in an example where a clashing inode on the destination file system is stored within the migration tree, that clashing inode can be deleted.

In some examples, the fourth file differs from a fifth file stored in the third source inode. That is, the clashing inode within the migration tree on the destination file system can store a different object than the inode with the clashing inode number on the source file system.

After operation 814, process flow 800 moves to 816, where process flow 800 ends.

FIG. 9 illustrates another example process flow 900 that can facilitate inode clash resolution during file system migration, in accordance with an embodiment of this disclosure. In some examples, one or more embodiments of process flow 900 can be implemented by inode clash resolution during file system migration component 110 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904. Operation 904 depicts, as part of migrating data from a source file system to a destination file system, determining that a first source inode number of a first source inode that stores the data on the source file system matches a second destination inode number of a second destination inode that is in use on the destination file system. In some examples, operation 904 can be implemented in a similar manner as operations 804-806 of FIG. 8.

After operation 904, process flow 900 moves to operation 906.

Operation 906 depicts creating a first file on the source file system in a second source inode having a second source inode number. In some examples, operation 906 can be implemented in a similar manner as operation 808 of FIG. 8.

In some examples, operation 906 comprises, before creating the first file on the source file system in the second source inode, creating a third source inode on the source file system; and in response to determining that the third source inode has a third source inode number that matches a third destination inode number of the destination file system, performing the creating of the first file in the second source inode. That is, an implementation similar to that described with respect to system architecture 600 of FIG. 6 can be implemented. Multiple temporary files can be created on the source file system until a temporary file that has an inode number not in use on the destination file system is generated. For example, in system architecture 600, inode 612A is generated but clashes with a destination inode, so then inode 612B is generated, which does not clash.

In some examples, operation 906 comprises repeatedly performing iterations of creating files on the source file system until producing a source inode number that is not stored on the destination file system. That is, using the example of FIG. 6, multiple instances of inode 612A can be created (e.g., inodes that clash) until an inode that does not clash is created (e.g., inode 612B).

After operation 906, process flow 900 moves to operation 908.

Operation 908 depicts determining that the destination file system omits an inode that has the second source inode number. In some examples, operation 908 can be implemented in a similar manner as operation 810 of FIG. 8.

After operation 908, process flow 900 moves to operation 910.

Operation 910 depicts moving a second file stored in the first destination inode to a second destination inode of the destination file system that has a second destination inode number. In some examples, operation 910 can be implemented in a similar manner as operation 912 of FIG. 8. This can involve swapping contents of destination inodes, so that a particular object can be stored in an inode having a particular inode number.

After operation 910, process flow 900 moves to operation 912.

Operation 912 depicts storing the first file with the second destination inode number on the destination file system. In some examples, operation 912 can be implemented in a similar manner as operation 814 of FIG. 8.

In some examples, after migrating the first file to the destination file system, a file handle that is configured to access the first file on the source file system is configured to access the first file on the destination file system. That is, e.g., a file handle issued by source file system 108A of FIG. 1 can then be used by destination file system 108B.

In some examples, operation 912 comprises, after migrating the first file to the destination file system, modifying an association of a network address from identifying a source computer on which the source file system is maintained to identifying a destination computer on which the destination file system is maintained. That is, a network address that was used to access the source file system can be redirected to access the destination file system, so that a client using a source file handle to address the source file system can then use that source file handle to address the destination file system without modification.

In some examples, the first source inode is associated with a first generation value, wherein the first destination inode is associated with a second generation value, and wherein the first generation value equals the second generation value. That is, in addition to preserving inode numbers for objects during a migration, inode generation numbers can also be preserved. An object stored in an inode having a given inode number and generation number on the source can be stored on the destination in an inode having that inode number and that generation number.

After operation 912, process flow 900 moves to 914, where process flow 900 ends.

Figure 10:
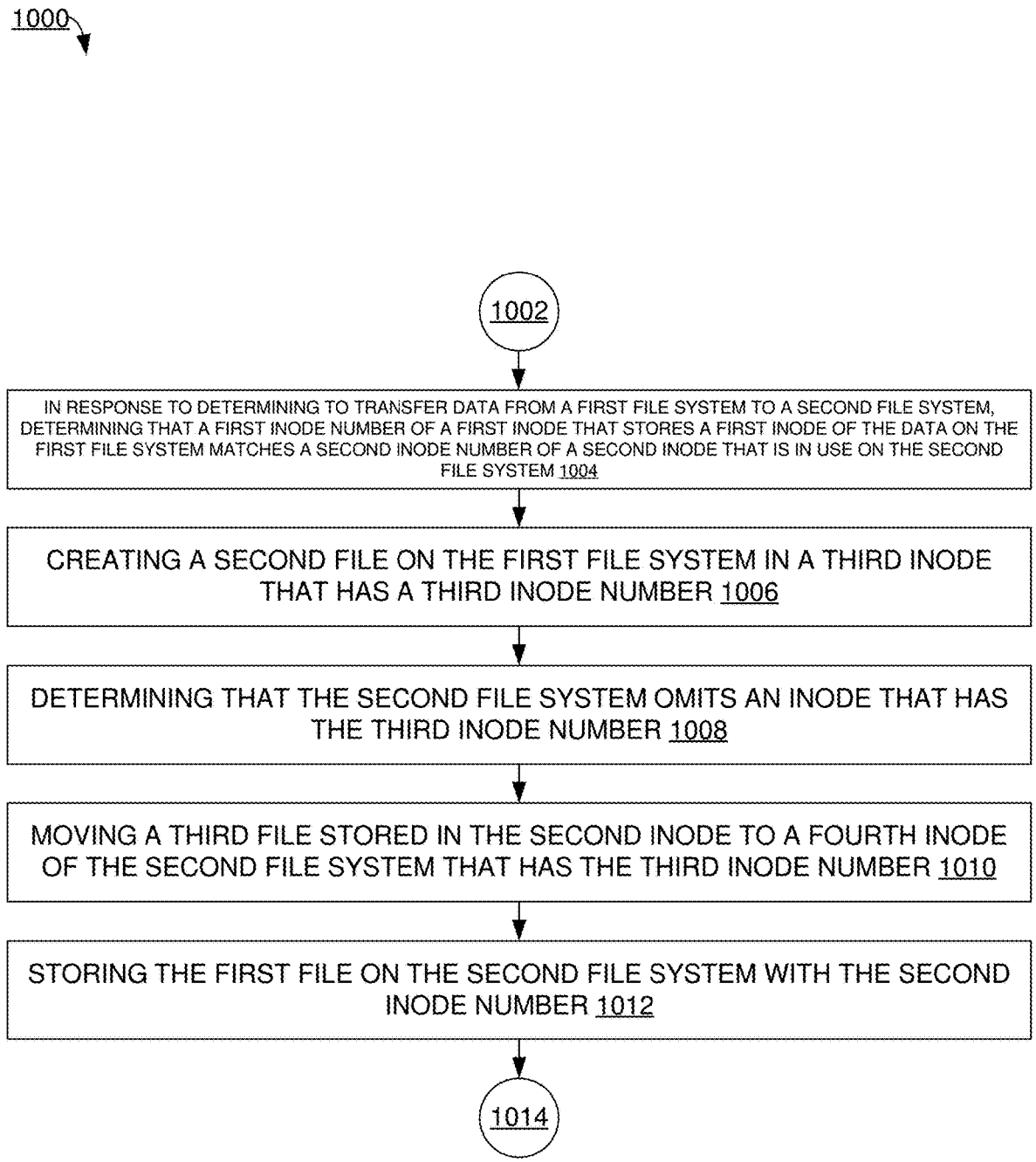
FIG. 10 illustrates another example process flow that can facilitate inode clash resolution during file system migration, in accordance with an embodiment of this disclosure.

FIG. 10 illustrates another example process flow 1000 that can facilitate inode clash resolution during file system migration, in accordance with an embodiment of this disclosure. In some examples, one or more embodiments of process flow 1000 can be implemented by inode clash resolution during file system migration component 110 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004. Operation 1004 depicts, in response to determining to transfer data from a first file system to a second file system, determining that a first inode number of a first inode that stores a first inode of the data on the first file system matches a second inode number of a second inode that is in use on the second file system. In some examples, operation 1004 can be implemented in a similar manner as operations 804-806 of FIG. 8.

In some examples, the data is first data, and a first inode space of the second file system that stores second data prior to determining to transfer the first data overlaps with a second inode space of the second file system to which the first data is transferred. That is, there can be an overlapping inode space (e.g., possible inode numbers used) between the source file system and the destination file system, so it is possible to have an inode clash where an inode number used to store one object on the source file system is used to store a different object on the destination file system.

In some examples, first file system utilizes inode numbers stored in a data size, and wherein the second file system utilizes inode numbers stored in the data size. That is, for example, both file systems can implement a Unix File System 64-bit (UFS64) bit architecture, that utilizes 64-bit inode numbers.

After operation 1004, process flow 1000 moves to operation 1006.

Operation 1006 depicts creating a second file on the first file system in a third inode that has a third inode number. In some examples, operation 1006 can be implemented in a similar manner as operation 808 of FIG. 8.

In some examples, operation 1006 comprises maintaining the second file on the first file system until after transferring the data from a first file system to a second file system is completed, or the transferring the data is cancelled. That is, contents of a temporary directory used in an identity factory on the source file system can be preserved until after a migration is completed or cancelled.

In some examples, operation 1006 comprises performing iterations of creating files on the first file system until producing an inode number that is not present on the second file system. That is, multiple instances of creating a temporary file (e.g., a file stored in inode 612A of FIG. 6) can be performed until a file with an inode number not in use on the destination file system (e.g., inode 612B) is created.

After operation 1006, process flow 1000 moves to operation 1008.

Operation 1008 depicts determining that the second file system omits an inode that has the third inode number. In some examples, operation 1008 can be implemented in a similar manner as operation 810 of FIG. 8.

After operation 1008, process flow 1000 moves to operation 1010.

Operation 1010 depicts moving a third file stored in the second inode to a fourth inode of the second file system that has the third inode number. In some examples, operation 1010 can be implemented in a similar manner as operation 1012 of FIG. 8.

After operation 1010, process flow 1000 moves to operation 1012.

Operation 1012 depicts storing the first file on the second file system with the second inode number. In some examples, operation 1012 can be implemented in a similar manner as operation 814 of FIG. 8.

In some examples, a first device that hosts the first file system issues a file handle that is configured to access the first file system, and a second device that hosts the second file system is configured to process file operations that reference the file handle after a cutover from the first file system to the second file system after copying the first file from the first file system to the second inode of the second file system. That is, a file handle issued by a source file system can be used by a client with a destination file system after cutover from the source file system to the destination file system.

After operation 1012, process flow 1000 moves to 1014, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of source system 102, and/or destination system 106 of FIG. 1

In some examples, computing environment 1100 can implement one or more embodiments of the process flows of FIGS. 8-10 to facilitate efficient transparent switchover and rollback of file system consolidation migrations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining to migrate data from a source file system to a destination file system, wherein the source file system stores data in source inodes having respective source inode numbers, wherein the destination file system stores data in destination inodes having respective destination inode numbers, and wherein the data comprises a first file that is stored in a first source inode of the source inodes having a first inode number of the source inode numbers; and
   in response to determining that the first inode number in the destination inode numbers is in use to store data other than a copy of the first file,
   creating a second file on the source file system, wherein the second file is stored in a second source inode of the source inodes having a second inode number of the source inode numbers, and wherein the second file is stored on the source file system outside of a migration path of the data that is being migrated from the source file system to the destination file system,
   determining that the second inode number is unused in the destination inode numbers,
   moving a third file stored in first destination inode that is associated with the first inode number to a second destination inode of the destination inodes that has a third inode number of the destination inode numbers, wherein the third inode number is unused among the source inodes that are associated with the migration path the data that is being migrated from the source file system to the destination file system, and
   migrating the first file from the first inode number in the source file system to the first inode number in the destination file system.

2. The system of claim 1, wherein determining that the first inode number in the destination inode numbers is in use to store data other than a copy of the first file comprises:
   determining that the first destination inode is stored outside of a migration path of the destination file system.

3. The system of claim 1, wherein the operations further comprise:
   as part of migrating the data, determining that the data comprises a third source inode of the source inodes having a third inode number of the source inode numbers;
   determining that a third destination inode of the destination inodes has the third inode number of the destination inode numbers; and
   in response to determining that the third destination inode is stored inside of a migration path of the destination file system, deleting a fourth file that is stored in the third destination inode.

4. The system of claim 3, wherein the fourth file differs from a fifth file stored in the third source inode.

5. The system of claim 1, wherein the second file is empty.

6. The system of claim 1, wherein the operations further comprise:
   storing the second file in a temporary folder; and
   deleting the temporary folder in response to determining that migrating the data is completed.

7. The system of claim 6, wherein the second folder is stored in a portion of the source file system that is outside of a migration path of the data.

8. The system of claim 1, wherein the operations further comprise:
   refraining from copying the second file from the source file system and to the destination file system as part of migrating the data.

9. A method, comprising:
   as part of migrating data from a source file system to a destination file system, determining, by a system comprising a processor, that a first inode number of a first source inode on the source file system stores different data than a first destination inode on the destination file system having the first inode number; and in response to the determining,
   creating, by the system, a first file on the source file system in a second source inode having a second source inode number,
   determining, by the system, that the destination file system omits an inode that has the second source inode number,
   moving, by the system, a second file stored in the first destination inode to a second destination inode of the destination file system that has a second destination inode number, and
   storing, by the system, the first file with the second destination inode number on the destination file system.

10. The method of claim 9, further comprising:
before creating the first file on the source file system in the second source inode, creating, by the system, a third source inode on the source file system; and
in response to determining that the third source inode and a third destination inode of the destination file system both have a third inode number, performing, by the system, the creating of the first file in the second source inode.

11. The method of claim 9, further comprising:
repeatedly performing, by the system, iterations of creating files on the source file system until producing an inode number that is not in use on the destination file system.

12. The method of claim 9, wherein, after migrating the first file to the destination file system, a file handle that is configured to access the first file on the source file system is configured to access the first file on the destination file system.

13. The method of claim 9, further comprising:
after migrating the first file to the destination file system, modifying, by the system, an association of a network address from identifying a source computer on which the source file system is maintained to identifying a destination computer on which the destination file system is maintained.

14. The method of claim 9, wherein the first source inode is associated with a first generation value, wherein the first destination inode is associated with a second generation value, and wherein the first generation value equals the second generation value.

15. A non-transitory computer-readable medium comprising instructions that, in response to execution, cause a system comprising a processor to perform operations, comprising:
   in response to determining to transfer data from a first file system to a second file system, determining that a first inode number of a first inode that stores first data of the data on the first file system matches a second inode number of a second inode that is in use to store second data that differs from the first data on the second file system; and
   in response to the determining that the first inode number of the first inode that stores the first data of the data on the first file system matches the second inode number of the second inode that is in use to store second data that differs from the first data on the second file system,
      creating a second file on the first file system in a third inode that has a third inode number,
      determining that the second file system omits an inode that has the third inode number,
      moving a third file stored in the second inode to a fourth inode of the second file system that has the third inode number, and
      storing the first file on the second file system with the second inode number.

16. The non-transitory computer-readable medium of claim 15, wherein the data is first data, and wherein a first inode space of the second file system that stores second data prior to determining to transfer the first data overlaps with a second inode space of the second file system to which the first data is transferred.

17. The non-transitory computer-readable medium of claim 15, wherein first file system utilizes inode numbers stored in a data size, and wherein the second file system utilizes inode numbers stored in the data size.

18. The non-transitory computer-readable medium of claim 15, wherein the operations further comprise:
   maintaining the second file on the first file system until after transferring the data from a first file system to a second file system is completed, or the transferring the data is cancelled.

19. The non-transitory computer-readable medium of claim 15, wherein the operations further comprise:
   performing iterations of creating files on the first file system until producing an inode number that is not present on the second file system.

20. The non-transitory computer-readable medium of claim 15, wherein a first device that hosts the first file system issues a file handle that is configured to access the first file system, and wherein a second device that hosts the second file system is configured to process file operations that reference the file handle after a cutover from the first file system to the second file system after copying the first file from the first file system to the second inode of the second file system.

* * * * *